United States Patent [19]

Skudera, Jr. et al.

[11] Patent Number: 4,647,863
[45] Date of Patent: Mar. 3, 1987

[54] SAW TRANSITION DETECTOR FOR PSK SIGNALS

[75] Inventors: William J. Skudera, Jr., Eatontown, N.J.; Charles E. Konig, Staten Island, N.Y.

[73] Assignee: The United States of America as represented by the Secretary of the Army, Washington, D.C.

[21] Appl. No.: 793,931

[22] Filed: Nov. 1, 1985

[51] Int. Cl.⁴ .......................................... H04L 27/22
[52] U.S. Cl. .................................. 329/112; 329/118; 329/137; 329/145; 375/1; 375/83
[58] Field of Search ............... 329/110, 112, 118, 137, 329/145, 117; 375/83–87, 1

[56] References Cited

U.S. PATENT DOCUMENTS 4,054,841 10/1977 Henaff et al. .................... 329/137 X
4,583,047 4/1986 LeGoffepouse Henaff et al. ........................................ 329/112

OTHER PUBLICATIONS

"Synchronous Delay-Line Detector Provides Wideband Performance" by J. F. Lutz, Microwaves and RF, Nov. 1982, pp. 71, 74–75, 79.

Primary Examiner—Siegfried H. Grimm
Attorney, Agent, or Firm—Sheldon Kanars; Jeremiah G. Murray; John K. Mullarney

[57] ABSTRACT

A phase transition detector for PSK signals which utilizes a dual channel SAW differential delay line to achieve a required delay. Each channel or path of the SAW device comprises an input and an output transducer. The two channels provide a predetermined differential delay (T) inasmuch as they are of different lengths. A PSK input signal is delivered to a power splitter, with the output therefrom coupled to the pair of input transducers of the SAW device. The output transducers are coupled to a multiplier which serves to detect phase transitions in the input PSK signal. The multiplier output is coupled to an output terminal via a low pass filter which provides harmonic repression. In another embodiment a SAW device comprises a bank of dual channel differential delay lines with each dual channel set to a different predetermined delay (T) so that a plurality of PSK signals of different chip rates can be separated out and detected. The PSK input signals are delivered to a power splitter, with the output therefrom coupled to a pair of input transducers of the SAW device. Output transducers are spaced predetermined distances from one or the other of said input transducers. Parallel sets of multipliers and low pass filters are coupled to predetermined SAW output transducers. Each multiplier serves to detect the phase transitions in one, and only one, PSK input signal. The input transducer(s) can be placed near the center of the SAW device, with the output transducers placed on the same, or either, side of the input transducer(s).

7 Claims, 7 Drawing Figures

SAW TRANSITION DETECTOR FOR PSK SIGNALS

The invention described herein may be manufactured, used, and licensed by or for the Government for governmental purposes without the payment to me of any royalties thereon.

TECHNICAL FIELD

The present invention relates to acoustic signal processing of a particular class of RF signals and, more particularly, to a transition detector employing a surface acoustic wave (SAW) device for determining the number of phase transitions in phase shift keying (PSK) signals.

BACKGROUND OF THE INVENTION

Delay networks have been used heretofore in the detection of RF signals. For example, a $\pi/2$ delay line detection circuit has been proposed for FM detection purposes; see "Synchronous Delay-Line Detector Provides Wideband Performance" by J. F. Lutz, Microwaves and RF, November 1982. The delay network used by Lutz is an electrical delay line such as wire or coaxial cable, and it is of substantial length. Also, such a delay line is of considerable bulk and this is contrary to present day efforts to reduce the size or miniaturize electronic components. Furthermore, when multiple signals are sent over the same transmission medium (e.g. spread spectrum) a plurality of lengthy, electrical delay lines would be required. The shortcomings of the prior art delay line detection circuits was the impetus for investigating the use of other and different delay networks for UHF, PSK detection purposes.

SUMMARY OF THE INVENTION

It is a primary object of the present invention to determine the number of phase transitions in PSK signals by employing a delay (e.g. SAW) device of compact configuration.

It is a further object of the present invention to determine the transition counts of a plurality of wideband, high chip rate, PSk spread spectrum signals in a single delay network of compact configuration.

The above and other objects are achieved in accordance with the present invention wherein a dual channel SAW differential delay line is utilized to achieve a predetermined requisite delay (T); to maximize the circuit of the invention for a particular chip rate the delay (T) is chosen equal to $t_c/2$, where $t_c$ is the reciprocal of the PSK chip rate ($f_c$). Each channel or path of the SAW device comprises an input transducer and an output transducer. These two channels or paths provide a predetermined differential delay; i.e., the paths are of different lengths (D) so as to provide the desired differential delay. The PSK input signal is delivered to a power splitter, with the output therefrom coupled to the pair of input transducers of the SAW device. The signal power delivered to each input transducer is approximately equal to that sent to the other. The output transducers are coupled to a multiplier circuit which serves to detect phase transitions in the input PSK signal. The multiplier output is coupled to an output terminal via a low pass filter.

Alternatively, the described SAW differential delay line may comprise a single input transducer and a pair of output transducers spaced predetermined distances from said input transducer. The difference between said predetermined distances provides the requisite differential delay (T). The multiplier is coupled to each of the pair of output transducers. In this arrangement, the aforementioned power splitter can be dispensed with.

In a further embodiment of the invention a SAW device comprises a bank of dual channel differential delay lines with each dual channel set to a different predetermined delay (T) so that a plurality of PSK signals of different chip rates can be detected. The PSK input signals are delivered to a power splitter, with the output therefrom coupled to a pair of input transducers of the SAW device. Output transducers are spaced predetermined distances from one or the other of said input transducers. Parallel sets of multipliers and low pass filters are coupled to predetermined SAW output transducers. Each multiplier serves to detect the phase transitions in one, and only one, input PSK signal.

In accordance with a feature of the invention the pair of input transducers are disposed near the middle of the SAW delay device and the output transducers are placed on either side of the input transducers so as to yield a very compact structure. This compactness is achieved because the SAW delay device is bidirectional. That is, the signals delivered to the input transducers travel in both directions (e.g., forward and backward) therefrom.

BRIEF DESCRIPTION OF THE DRAWINGS

The invention will be more fully appreciated from the following detailed description when the same is considered in connection with the accompanying drawings, in which.

DETAILED DESCRIPTION

Figure 1:
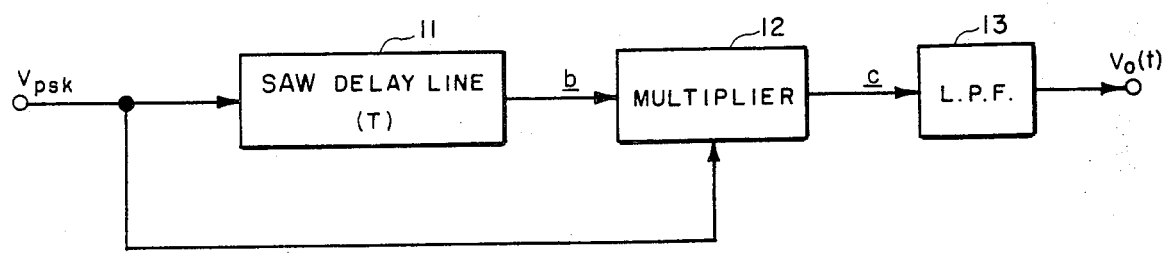
FIG. 1 is a much simplified schematic block diagram of a SAW transition detector for a PSK signal in accordance with the present invention.

FIG. 1 shows a SAW Transition Detector for PSK signals in accordance with the present invention. Both surface acoustic wave (SAW) devices and phase shift keying (PSK) are so well known and so extensively described in the technical literature that further detailed explanation herein would not appear to be warranted. A PSK signal (Vpsk), having a chip rate of 5, 10, 20 . . . megahertz (MHz), is coupled to the input of the SAW device 11. The carrier frequency ($f_o$) of the input signal is an integral multiple of the chip frequency ($f_c$). The input Vpsk is also directly coupled to the multiplier 12, as is the output of the SAW device 11. As the name implies, the multiplier 12 multiplies the two inputs thereto. Multiplier 12 and low pass filter 13 will be described in greater detail hereinafter.

The input signal, V(t), is defined as follows:

$$V(t) = V_{psk}(in) = \frac{V(t)A}{V} \cos w_o t \cos w_c t \quad (1)$$

The input signal delivered to the multiplier Vpsk (a) is, of course, the same as V(t). The delayed signal coupled to multiplier 12 from the SAW delay line 11 is therefore defined as:

$$V_{psk}(b) = \frac{V(t-T)}{V} A \cos w_o(t - T) \cos w_c(t - T) \quad (2)$$

Where $w_o = 2\pi f_o$, $w_c = 2\pi f_c$, T is the delay, and A is a constant.

The multiplier output, Vpsk(c), is therefore:

$$V_{psk}(c) = \quad (3)$$

$$\frac{V(t)V(t-T)A^2}{V^2} \cos w_o t \cos w_c t \cos w_o(t-T) \cos w_c(t-T)$$

It can be shown mathematically that Vpsk(c) is therefore equal to:

$$\frac{V(t)V(t-T)A^2}{4V^2} (\cos w_o T + \cos 2w_o(t - T/2)) \cdot \quad (4)$$

$$(\cos w_c T + \cos 2w_c(t - T/2))$$

The low pass filter 13 eliminates or filters out the higher order (harmonic) terms so that the output of the FIG. 1 circuit is given as:

$$V_{out} = \frac{V(t)V(t-T)A^2}{4V^2} \cos w_o t \cos w_c T \quad (5)$$

Now in order that the Vout signal be as large as possible, T must be selected so that $\cos w_c T = 1$; therefore $w_c T = n\pi$; letting $n = 1$, then $$T = \frac{\pi}{w_c} = \frac{\pi}{2\pi f_c} = \frac{1}{2f_c} = \frac{t_c}{2}.$$

Cos $w_o$ T is virtually unaffected by the relatively small chip rate ($f_c$) values, since the carrier frequency is much higher than the chip rate. By way of example, if $f_c = 10$ MHz, $f_o$ might typically be 100 MHz. Here again, it should be noted that $f_o$ is chosen as an integral multiple of $f_c$.

If $f_c = 10$ MHz, then $$T = \frac{\pi}{w_c} = \frac{1}{2f_c} = \frac{1}{2 \cdot 10 \cdot 10^6} = 50 \text{ nsec.}$$

And, substituting, Cos $w_o T = \cos 2\pi(100 \cdot 10^6) \cdot (50 \cdot 10^{-9})$. Therefore, cos $w_o T \approx 1$, because $n = 10$. The equation (5) for maximum Vout thus reduces to:

$$V_{out} = \frac{V(t)V(t-T)A^2}{4V^2}$$

Figure 2:
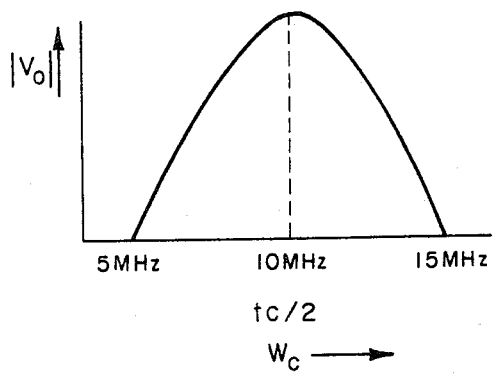
FIG. 2 is a graph which shows that the FIG. 1 circuit will be optimized for a particular chip rate.

If T is greater than 50 nanoseconds (>50 nsec.) or less than 50 nanoseconds (<50 nsec.), the Vout will vary as a cosine function. For example, if the chip rate is 15 MHz and T is 50 nsec, then Cos $w_c T \approx 0$; and if the chip rate is 5 MHz, with a T of 50 nsec, then Cos $w_c t \approx 0$. The above is illustrated in FIG. 2 where |Vout| is plotted against $w_c$. At 5 MHz, 15 MHz Vout $\approx 0$. However, when the FIG. 1 circuit is maximized for a particular chip rate (i.e., $T = t_c/2$), |Vout| is a maximum. Stated somewhat differently, $T(= t_c/2)$ is an optimum for one, and only one, chip rate.

Figure 3:
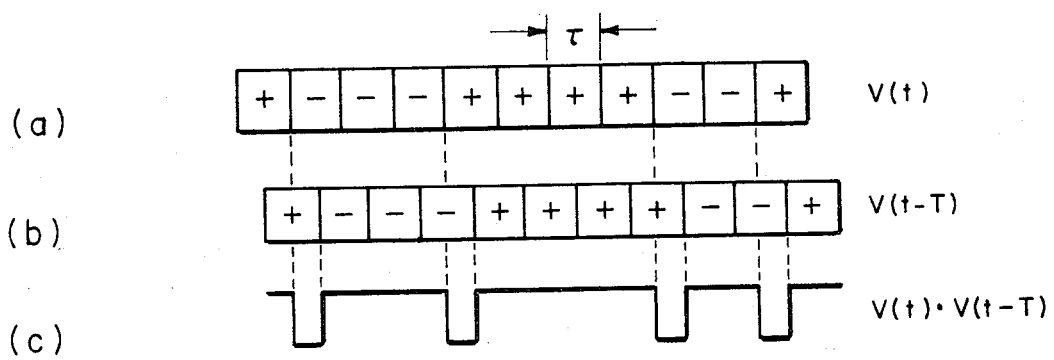
FIG. 3 is a diagram depicting the inputs to and the output from the multiplier of FIG. 1.

FIG. 3 is a simplified diagram used to illustrate the operation of the multiplier 12. FIG. 3a shows a block of input PSK bits, each of a bit length of τ. A plus bit represents a zero phase shift and a minus bit represents a 180° phase shift. FIG. 3b shows the delayed output, V(t−T), of the SAW delay line 11. When the PSK signals represented by FIGS. 3a and 3b are delivered to the multiplier 12, the output represented by FIG. 3c results. The four phase transitions (plus-to-minus or minus-to-plus) in the input PSK signal result in the four pulses shown in FIG. 3c. Thus, for every transition in the input PSK signal the multiplier 12 provides an output indication of the same. Recalling simple algebra, a (+)·(+)=(+); (+)·(−)=(−); (−)·(+)=(−) and (−)·(−)=(+). Thus, at the first transition (a plus-to-minus) in FIG. 3a, the output represented by FIG. 3c goes negative (−). And, when the delayed version, V(t−T), of this transition occurs at the output of the delay line (FIG. 3b) the negative output pulse is terminated (FIG. 3c goes positive). Applying the above-noted simple algebraic expressions to the FIGS. 3a and 3b diagrams, the derivation of the FIG. 3c diagram should be obvious.

Figure 4:
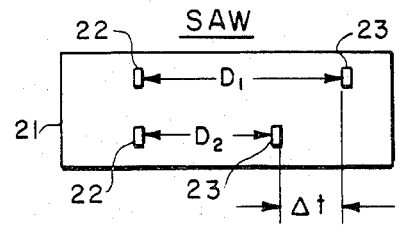
FIG. 4 illustrates a dual channel SAW differential delay line in accordance with the invention.

FIG. 4 shows a dual channel SAW differential delay line in accordance with the present invention. The SAW device 21 may comprise an ST-X quartz SAW substrate, with a pair of input transducers 22 and a pair of output transducers 23 deposited on the surface thereof. The two channels or paths are of different lengths ($D_1, D_2$) so as to achieve the desired differential delay. $\Delta D = D_1 - D_2$; where, for example, $D_1 = V_a \cdot t_1$; and, $D_1$ is the distance in cm., $V_a$ is the acoustic velocity, and t is the time in μsec. By way of example, the difference $\Delta t$ required at $f_o = 100$ MHz and a bandwidth of 10 MHz for a PSK signal is 0.05 μsec. This translates to a $\Delta D$ of 0.01578 cm. using a $V_a = 3.158 \times 10^5$ cm./sec. (ST-X quartz, SAW substrate). A $\Delta D$ of this dimension is readily obtained since today's technology can achieve transducer lines separated by less than 1 μm. The differential time or differential delay $\Delta t = t_c/2 = T$.

Figure 5:
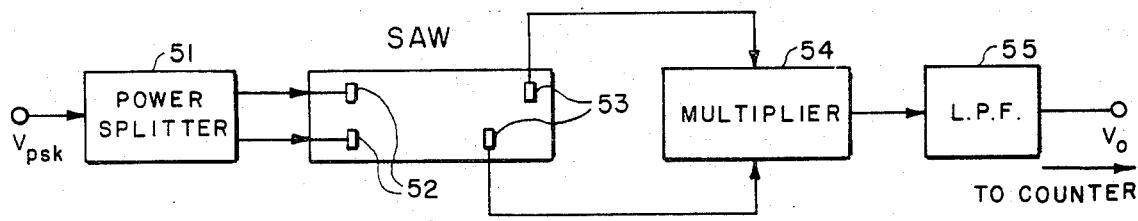
FIG. 5 is a schematic block diagram of a SAW transition detector for a given chip rate.

A SAW delay line is known to be very linear with frequency, with excellent phase linearity and wide bandwidth at UHF operating frequencies. The implementation of such a delay line, however, requires the described dual channel line to achieve the requisite short delay, and also so that feed-through can be suppressed and the two channels normalized with respect to signal loss. FIG. 5 shows the practical realization of the SAW transition detector for a particular chip rate. The input PSK signal is delivered to a power splitter 51, with the output therefrom coupled to a pair of input transducers 52 of the SAW device 50. The signal power delivered to each of the input transducers is substantially equal. The output transducers 53 are coupled to a multiplier circuit 54, such as that previously described. The multiplier serves to detect phase transitions in the PSK signal. The multiplier output is delivered to a low pass filter 55, which filters out all of the higher order (harmonic) terms. For present purposes, the output from the lowpass filter is then delivered to a conventional counter (not shown), which counts the number of phase transitions in a given block of PSK signals. For the intended application of the invention (i.e., ELINT Radar) it is only necessary to determine the number of phase transitions in said block.

Figure 6:
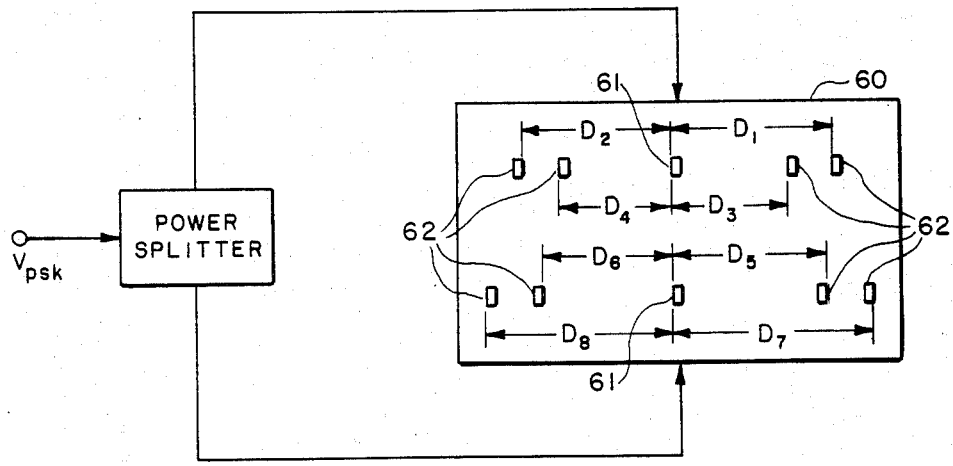
FIG. 6 illustrates a bank of dual channel SAW differential delay lines, each set to a different (T) value so that PSK signals of different chip rates can be detected.

FIG. 6 shows a SAW device 60 which comprises a bank of dual channel differential delay lines with each dual channel set to a different predetermined delay (T) so that a plurality of PSK signals, transmitted in spread spectrum fashion over a common transmission medium, can each be detected. The PSK input signals are delivered to a power splitter, as previously described, with the output therefrom coupled to a pair of input transducers 61 of the SAW device 60. The output transducers 62 are spaced predetermined distances from one or the other of said input transducers. Now, since SAW delay lines are known to be bidirectional devices, the input transducers can be placed at or near the center of the SAW device, and the output transducers placed on either side of the input transducers. This yields a very compact structure. If the required differential time delays are given as $T_1$, $T_2$, $T_3$, $T_4$, then $T_1 = D_1 - D_2/V_a$, where $V_a$ is the acoustic velocity and is a constant for a given substrate at a given frequency. Also, $T_2 = D_3 - D_4/V_a$, and so on. The distances $D_1, D_2, \ldots D_8$ are illustrated in FIG. 6 of the drawings. $T(=t_c/2)$ is an optimum value for one, and only one, PSK chip rate and, therefore, the multiple chip rate detector suggested in FIG. 6 and shown in FIG. 7 is feasible.

Figure 7:
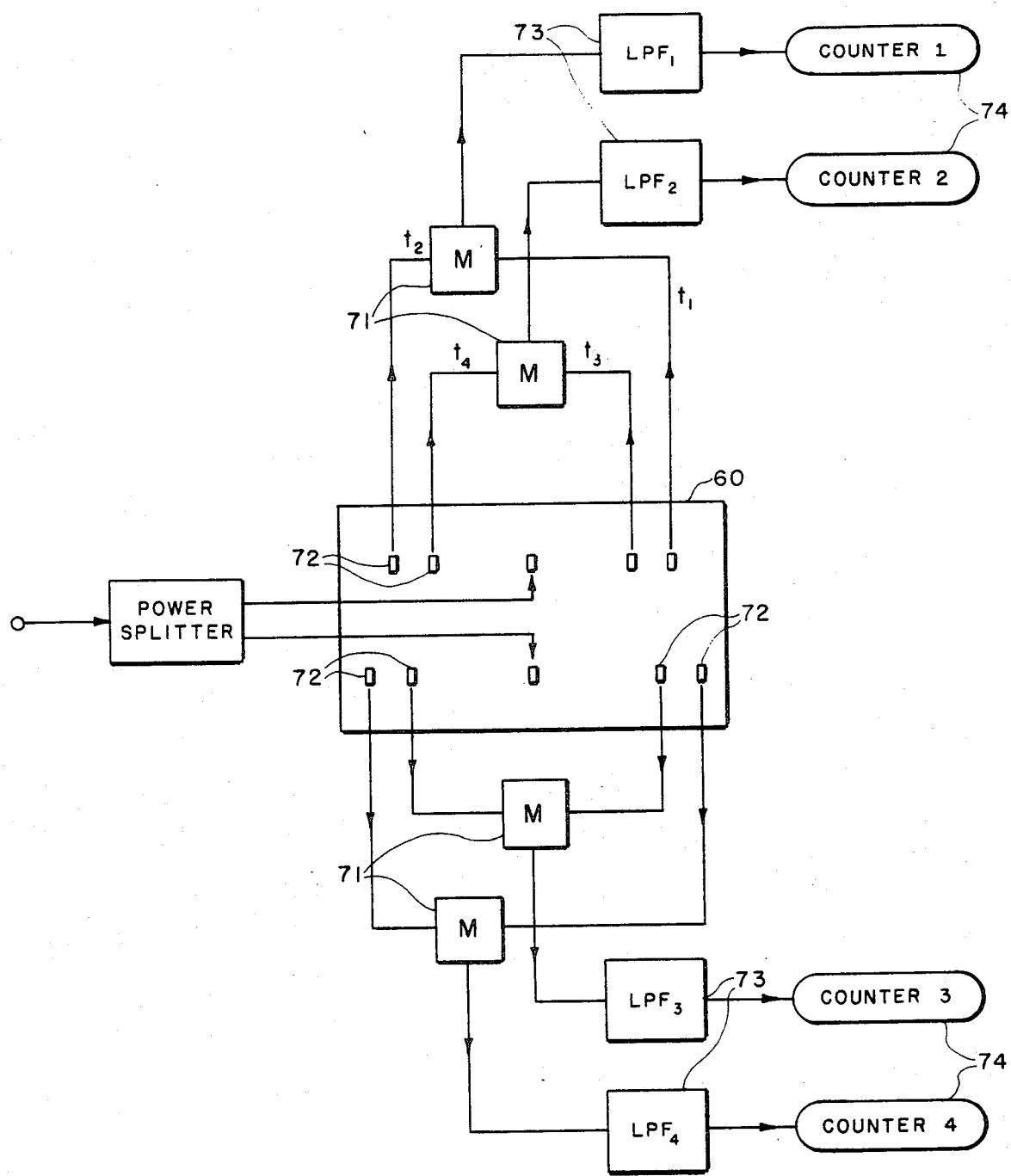
FIG. 7 shows a complete system, incorporating the SAW device of FIG. 6, for the transition detection of PSK signals with different chip rates.

FIG. 7 shows a complete detection system, incorporating the SAW device of FIG. 6, for the transition detection of multiple chip rate PSK input signals transmitted in a spread spectrum manner. Multipliers 71 are connected to selected output transducers 72, in the manner shown in FIG. 7, to selectively detect the phase transitions in each of a plurality of PSK input signals. Thus, the phase transitions of each PSK input signal are effectively demultiplexed out of the received spread spectrum signal. This demultiplexing is possible because each delay value, T, is an optimum for one, and only one, PSK chip rate. Each multiplier output is delivered to a low pass filter 73 for filtering out the higher order terms and thence to a counter 74 of conventional design which serves to count the number of phase transitions in a given block of PSK input signals. It perhaps should be noted that SAW tap reflections can easily be handled with known impedance matching techniques that are well documented.

The arrangement shown in FIG. 7 serves to detect the phase transitions in four PSK input signals. Additional output transducers, and the accompanying multipliers and low pass filters, could be used to detect the phase transitions in five, six, etc. PSK input signals. Alternatively, to detect the phase transitions in just two PSK input signals, one half of the SAW device 60 could be dispensed with. Thus, only a single input transducer would be needed and the power splitter could be eliminated. Similarly, for a single PSK input signal one half of the SAW device 50, of FIG. 5, might be dispensed with. The SAW device 50 would then comprise a single input transducer 52 and a pair of output transducers 53 positioned at predetermined distances from the input transducer so as to achieve the requisite differential delay (T). The pair of output transducers could be placed on the same side of the input transducer or placed on opposite sides thereof. The only thing of importance here is that the differential delay be equal to T. Accordingly, while specific embodiments of the invention have been described in detail herein, it is to be understood that numerous other embodiments may be devised by those skilled in the art without departing from the spirit and scope of the invention.

What is claimed is:

1. A phase transition detector for a phase shift keying (PSK) signal comprising a dual channel, surface acoustic wave (SAW), differential delay line, each channel of said SAW delay line including an input transducer and an output transducer, each channel having a given delay which is different from that of the other channel so as to provide a predetermined differential delay (T) therebetween, multiplier means coupled to the output transducer of each channel for detecting the phase transitions in an input PSK signal, and filter means coupled to the output of said multiplier means for filtering out all higher order, harmonic terms, said predetermined differential delay (T) being equal to $t_c/2$, where $t_c$ is the reciprocal of the chip rate ($f_c$) of said input PSK signal.

2. A phase transition detector as defined in claim 1 wherein said input transducer is common to each channel.

3. A phase transition detector as defined in claim 2 wherein the output transducers are respectively placed on opposite sides of said input transducer.

4. A phase transition detector as defined in claim 1 wherein each channel has a separate and distinct input transducer.

5. A phase transition detector as defined in claim 4 including a power splitter means for splitting an input PSK signal delivered thereto into two signals of substantially equal power, and means for coupling each of said two signals to a respective input transducer.

6. A surface acoustic wave (SAW) device having a bank of dual channel SAW differential delay lines for use in detecting the phase transitions in a plurality of PSK input signals of different chip rates, said SAW device comprising a piezoelectric substrate and a finished surface thereon, a pair of input transducers deposited on said surface at or near the middle of said SAW device, and a plurality of output transducers also placed on said surface, said output transducers being positioned at spaced predetermined distances from one or the other of said input transducers, each channel including an input and a spaced output transducer, each channel having a given delay which is different from that of the other channel of a dual channel delay line so as to provide a selected differential delay therebetween, said differential delay (T) being equal to $t_c/2$, where $t_c$ is the reciprocal of the chip rate ($f_c$) of an input PSK signal.

7. A phase transition detector for a plurality of phase shift keying (PSK) input signals of different chip rates comprising a bank of dual channel SAW differential delay lines, each channel of the dual channel delay lines having an input transducer and an output transducer, each channel having a given delay which is different from that of the other channel of a dual channel delay line so as to provide a selected differential delay therebetween, each differential delay (T) being equal to $t_c/2$, where $t_c$ is the reciprocal of the chip rate ($f_c$) of a respective PSK input signal, a plurality of multiplier means each respectively coupled to the output transducers of a dual channel delay line, each multiplier means serving to detect the phase transitions in a given PSK input signal, and a plurality of low pass filter means each respectively coupled to the output of a multiplier means for filtering out all higher order, harmonic terms.

* * * * *